(12) United States Patent  
Graham

(10) Patent No.: US 8,442,365 B2  
(45) Date of Patent: May 14, 2013

(54) OPTICAL SUBASSEMBLY FOR COUPLING LIGHT INTO AN OPTICAL WAVEGUIDE

(75) Inventor: Luke Graham, Tucson, AZ (US)

(73) Assignee: JDS Uniphase Corporation, Milpitas, CA (US)

( * ) Notice: Subject to any disclaimer, the term of this patent is extended or adjusted under 35 U.S.C. 154(b) by 663 days.

(21) Appl. No.: 12/648,608

(22) Filed: Dec. 29, 2009

(65) Prior Publication Data

US 2010/0329605 A1    Dec. 30, 2010

Related U.S. Application Data

(60) Provisional application No. 61/220,846, filed on Jun. 26, 2009.

(51) Int. Cl.
G02B 6/32 (2006.01)

(52) U.S. Cl.
USPC ............................................................ 385/33

(58) Field of Classification Search ............ 385/33
See application file for complete search history.

(56) References Cited

U.S. PATENT DOCUMENTS

| | | | |
|---|---|---|---|
| 6,496,621 B1 | 12/2002 | Kathman et al. | 385/31 |
| 6,530,697 B1 | 3/2003 | Johnson et al. | 385/88 |
| 6,807,336 B2 | 10/2004 | van Haasteren | 385/33 |
| 6,822,794 B2 | 11/2004 | Coleman et al. | 359/565 |
| 6,856,460 B2 | 2/2005 | Coleman et al. | 359/565 |
| 6,952,507 B2 | 10/2005 | Johnson et al. | 385/31 |
| 7,221,823 B2 | 5/2007 | Kathman et al. | 385/33 |
| 7,343,069 B2 | 3/2008 | Kathman et al. | 385/39 |
| 2003/0072526 A1* | 4/2003 | Kathman et al. | 385/31 |
| 2006/0092492 A1* | 5/2006 | Ishibe | 359/207 |
| 2008/0094597 A1* | 4/2008 | Hirai et al. | 355/67 |
| 2008/0214021 A1* | 9/2008 | Tanaka et al. | 438/798 |
| 2009/0136236 A1* | 5/2009 | Glebov et al. | 398/139 |
| 2009/0226134 A1 | 9/2009 | Kathman et al. | 385/31 |

OTHER PUBLICATIONS

"Light Coupling by a Vortex Lens Into Graded Index Fiber" by Johnson et al., Journal of Lightwave Technology, vol. 19, No. 5, p. 753-758, May 2001.

* cited by examiner

*Primary Examiner* — Ryan Lepisto  
*Assistant Examiner* — Jerry Blevins  
(74) *Attorney, Agent, or Firm* — Matthew A. Pequignot; Pequignot + Myers LLC

(57) ABSTRACT

An optical subassembly for low-feedback coupling of light from a light source into an optical waveguide such as an optical fiber is described. The optical subassembly has an aspherical lens with surface sag having a rotationally symmetrical sag component without having a cone sag component, and a rotationally asymmetrical helical component for reducing coupling of light reflected from the optical fiber tip back into the laser aperture by causing a significant portion of the reflected light to encircle the laser aperture. The lens shape and the height of the helix are selected so that tight focusing onto the fiber tip is preserved, while the optical feedback is reduced.

20 Claims, 6 Drawing Sheets

OPTICAL SUBASSEMBLY FOR COUPLING LIGHT INTO AN OPTICAL WAVEGUIDE

CROSS-REFERENCE TO RELATED APPLICATIONS

The present invention claims priority from U.S. Patent Appln. No. 61/220,846 filed Jun. 26, 2009, which is incorporated herein by reference for all purposes.

TECHNICAL FIELD

The present invention relates to optical subassemblies for light coupling, and in particular to optical subassemblies for coupling light from a backreflection-sensitive light source into an optical waveguide.

BACKGROUND OF THE INVENTION

In fiberoptic communications, light from a light source, such as a laser or a light emitting diode (LED), is modulated with a data stream at a high rate and transmitted through a length of an optical fiber between two or more geographical locations. The laser is usually coupled to the optical fiber using a lens.

One of the problems in fiberoptic communications is that optical feedback, or backreflection from the optical fiber to the laser light source affects the laser operation and gives rise to jitter in the timing of the rising and falling edges of the modulated optical signal. The effects of the optical feedback are most severe with single-mode lasers, for example 1310 nm vertical cavity surface emitting lasers (VCSELs) or distributed feedback (DFB) lasers, but are also significant with multimode lasers, for example 850 nm VCSELs or Fabry-Perot (FP) lasers. Therefore, there exists a need to reduce the optical feedback into single-mode lasers and multimode lasers due to reflection from optical fiber tips.

In U.S. Pat. Nos. 6,822,794 and 6,856,460 incorporated herein by reference, Coleman et al. disclose a diffractive optical element for launching light emitted by a laser into an optical fiber while reducing optical feedback into the laser. Referring to FIG. 1A, a light coupling system 10 of Coleman et al. is shown. The system 10 has a laser light source 11, a biconvex transfer lens 14 having a diffractive surface 15 and a refractive surface 16, and a multimode optical fiber 12. The diffractive surface 15 has a spatially non-uniform optical phase delay function represented by a vortex-like pattern shown in FIG. 1B. The vortex-like pattern is a combination of radially and axially symmetrical patterns and is constructed to create particular optical beam launch conditions at the multimode fiber 12, at which the center of the multimode optical fiber 12 is avoided. When the center of the multimode optical fiber 12 is avoided, a modal dispersion performance of the light coupling system 10 is improved. In addition, backreflection into the laser 11 is also reduced due to the presence of diffractive surface 15, which redirects the reflected light away from an aperture 17 of the light source 11.

In U.S. Pat. No. 6,807,336 incorporated herein by reference, van Haasteren discloses an optical lens having a surface mathematically described by a sum of conical, cone, and spiral components. The lens is suitable for launching light into a multimode optical fiber because the specific surface profile results in creating an annular light distribution pattern at the fiber tip, so that the center of the optical fiber can be avoided. When the fiber center is avoided, the modal dispersion is reduced. Optical feedback to the laser light source is also reduced.

One drawback of these prior art approaches is increased sensitivity to optical misalignment. The complex lenses of prior art create a relatively large spot at the fiber tip. Due to the large spot size, the focused laser beam can become clipped at the optical fiber resulting in power loss and reliability problems. Tight tolerances required for assembly of the laser-to-fiber couplers of the prior art result in high manufacturing costs.

A need therefore exists for a misalignment-tolerant optical subassembly for coupling light into an optical fiber, which has low levels of optical feedback into the light source.

SUMMARY OF THE INVENTION

In accordance with the invention there is provided an optical subassembly comprising a light source having an aperture for emitting light, an optical waveguide having an aperture for receiving light, and a lens for coupling light emitted from the light source aperture into the optical waveguide aperture, wherein the lens has a surface having a sag consisting of a superposition of a rotationally symmetrical sag component and a rotationally asymmetrical sag component, wherein the rotationally asymmetrical sag component is for lessening coupling of light reflected from the waveguide back into the light source aperture, due to the light reflected from the waveguide forming a donut-shaped spot at the light source, whereby at least a fraction of the reflected light encircles the light source aperture, and wherein the rotationally symmetrical sag component is one of spherical sag component or aspherical sag component not having a cone sag component.

In accordance with another aspect of the invention, a housing of the optical subassembly is monolithically integrated with the lens, so that the light source and the optical waveguide are supported by the housing.

In accordance with another aspect of the invention there is further provided a method for reducing backreflection when coupling light from a light source into an optical waveguide, comprising providing a lens for coupling light emitted from an aperture of the light source into an aperture of the optical waveguide, wherein the lens has a surface having a sag consisting of a superposition of a rotationally symmetrical sag component and a rotationally asymmetrical sag component, wherein the rotationally asymmetrical sag component is for lessening coupling of light reflected from the waveguide back into the light source aperture, due to at least a fraction of the light reflected from the waveguide encircling the light source aperture, and wherein the rotationally symmetrical sag component is one of spherical sag component or aspherical sag component not having a cone sag component.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1A:
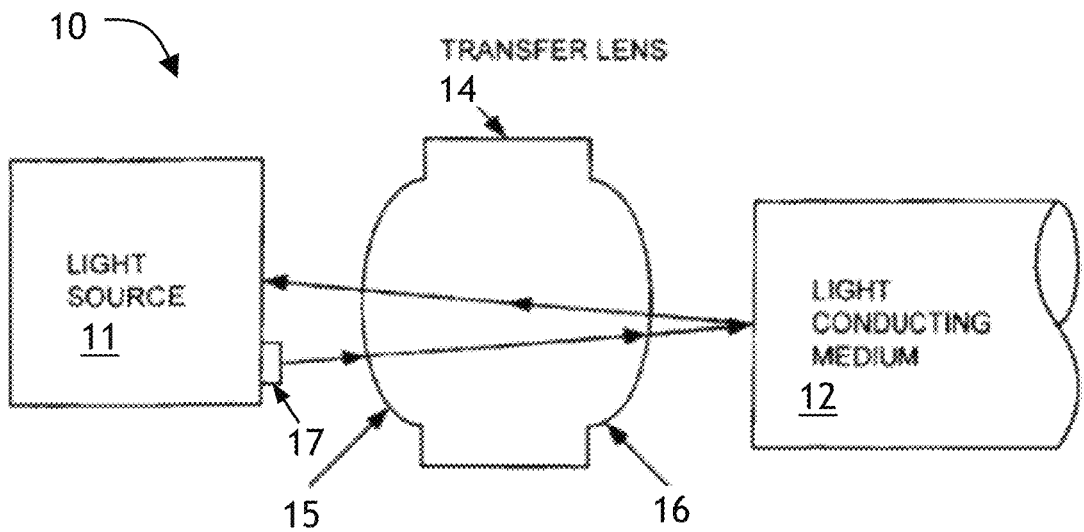
FIG. 1A is a diagram of a conventional light coupling system including a lens having a diffractive surface.
Figure 1B:
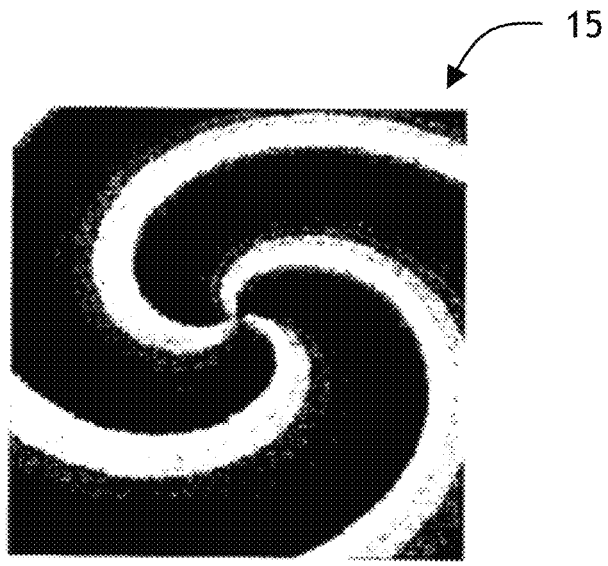
FIG. 1B is a plan view of the diffractive surface of the light coupling system of FIG. 1A.
Figure 2:
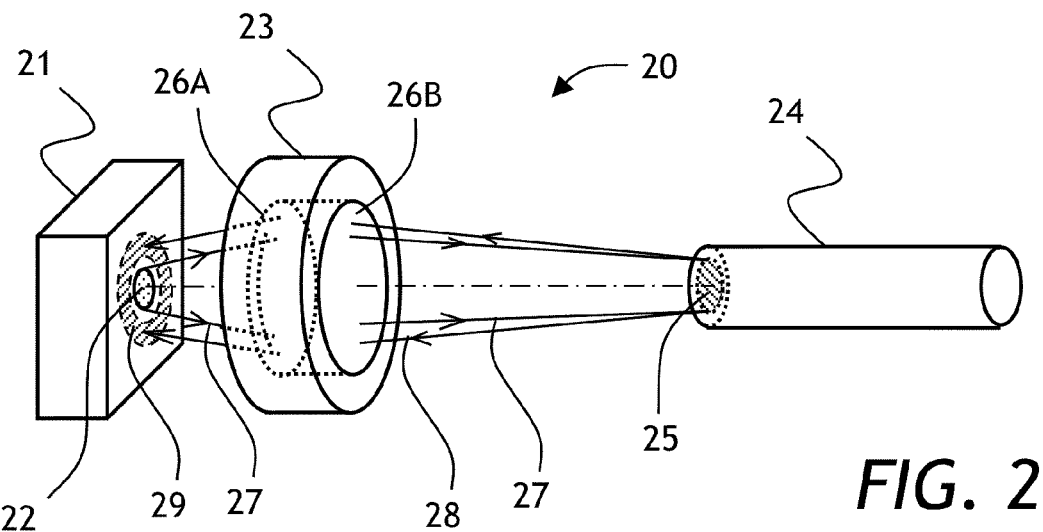
FIG. 2 is an isometric view of an optical subassembly for coupling light according to the present invention.

Referring to FIG. 2, an optical subassembly 20 of the present invention includes a light source, such as a vertical cavity surface-emitting laser (VCSEL) 21 having an aperture 22, and a multimode optical fiber 24 having an aperture 25, with a lens 23 disposed therebetween. The VCSEL 21, the lens 23, and the multimode optical fiber 24 are coaxially disposed. The lens 23 has surfaces 26A and 26B. The surface 26A has a surface profile, or so called surface sag, described by two sag components: an aspheric component and a helical component. In operation, light emitted by the aperture 22 of the VCSEL 21 is focused into the aperture 25 of the fiber 24, as shown schematically with right-pointing arrows 27. Light reflected from the fiber 24 propagates back through the lens 23 towards the VCSEL 21, as shown with left-pointing arrows 28. Presence of the helical sag component in the sag of the surface 26A results in the reflected light forming a donut-shaped spot 29 encircling the aperture 22 of the VCSEL 21. As a result, coupling of reflected light into the aperture 22 of the VCSEL 21 is decreased, and the optical feedback into the aperture 22 of the VCSEL 21 is lessened. An optical waveguide can be used in place of the optical fiber 24, and any suitable light source can be used in place of the VCSEL 21.

Figure 3A:
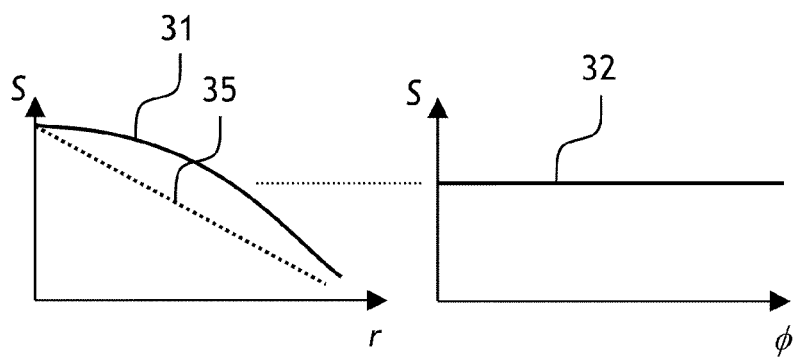
FIG. 3A illustrates a sag plot for an aspheric sag component of a lens surface of FIG. 2, and a cone sag component of a conic lens.
Figure 3B:
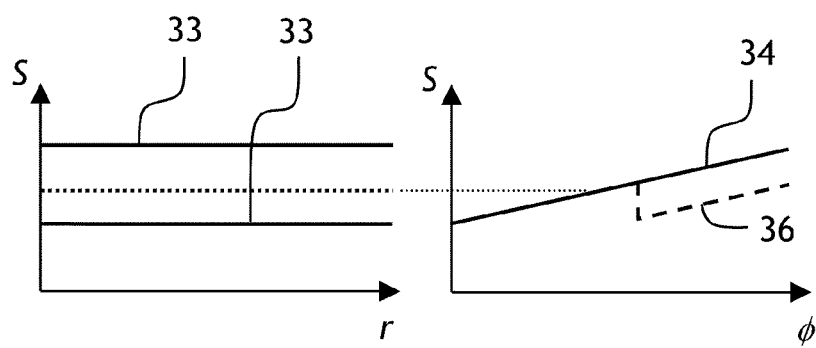
FIG. 3B illustrates sag plots for a helical sag component and a segmented helical sag component of the lens surface of the optical subassembly of FIG. 2.

Turning to FIGS. 3A and 3B, the aspherical and helical surface sag components of the surface 26A of the lens 23 from FIG. 2 are illustrated with plots of the surface sag value as a function of a radial coordinate r and an azimuthal angle $\phi$ of a polar coordinate system having the origin at a center of the surface 26A of the lens 23. In FIG. 3A, lines 31 and 32 represent the aspherical sag component as a function of r and $\phi$, respectively. The sag component 32 does not change with the azimuthal angle $\phi$ because the aspherical component is rotationally symmetric. The aspherical sag component $S_A$ is defined by the following equation:

$$S_A = \frac{cr^2}{1 + \sqrt{1 - (1+k)c^2r^2}} \quad (1)$$

wherein c is curvature (reciprocal of radius of curvature), and k is the conic constant. It has to be noted that the function $S_A$ of Eq. (1) does not contain a term proportional to r. A term proportional to r is shown at 35 in FIG. 3A for the purposes of illustration only. It defines a cone sag component and is normally included in a lens sag function to create a ring shaped spot at the focal plane. In the present invention, however, it is not used, for the reasons discussed below.

In FIG. 3B, lines 33 and 34 represent the helical component as a function of r and $\phi$, respectively. The sag component does not change with radius r and is a linear function of the azimuthal angle $\phi$. The helical sag component $S_B$ is defined by the following equation:

$$S_B = \frac{b}{2\pi}\phi \quad (2)$$

wherein b is a helical step size.

In one embodiment, the helix has two or more radial segments, with the sag component represented by the tooth-like function shown at 36. This segmented helical sag component $S_{B2}$ is defined by the following equation:

$$S_{B2} = b \cdot F\left(M\frac{\phi}{2\pi}\right) \quad (3)$$

wherein F is a function returning the fraction of the argument, that is, a part to the right from the decimal point, and M is the number of helical segments on the surface 26A.

The complete sag S of the surface 26A is described by the following equation:

$$S = S_A + S_B \quad (4)$$

Figure 4:
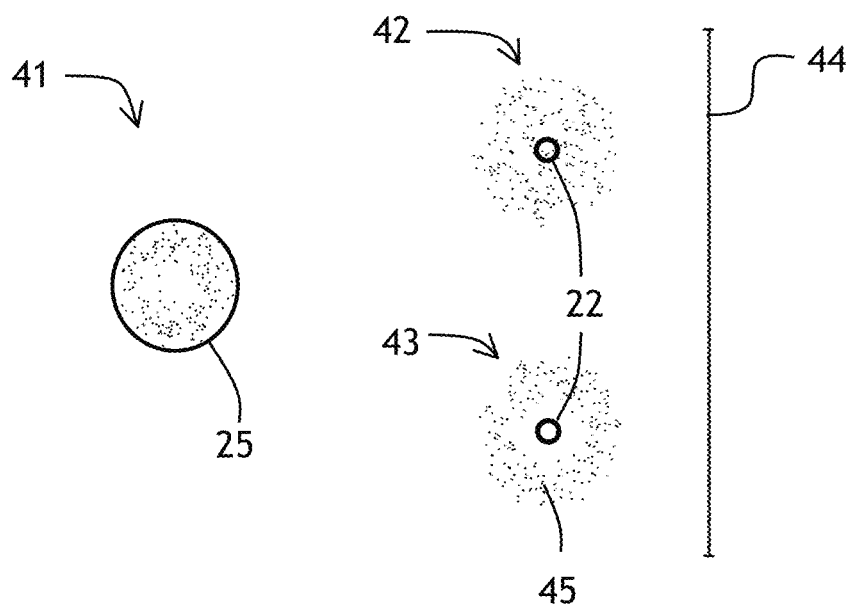
FIG. 4 shows spot diagrams of light focused at the fiber tip and reflected therefrom back onto the light source, in accordance with the present invention.

Turning now to FIG. 4, three spot diagrams are presented. A spot diagram 41 represents light focused into the aperture 25 of the fiber 24. A spot diagram 42 represents light reflected back onto the VCSEL 21 through a conventional lens not having the helical sag component $S_B$. A spot diagram 43 represents light reflected back onto the VCSEL 21 through the lens 23. The VCSEL 21 and the lens 23 are shown in FIG. 2. A bar 44 in FIG. 4 is a 200 microns scale bar. The fiber aperture 25 is a circle with a diameter of 50 microns. The VCSEL aperture 22 is a circle with a diameter of 8 microns. The spot diagrams 41 and 43 have been obtained using a ZEMAX™ ray tracing software with the following input parameters: 1/c=0.567 mm; k=−1.42; b=3 microns; light source numerical aperture (NA) of 0.19, and refractive index n=1.632, which corresponds to the refractive index of Ultem™ 1010 material at the wavelength of 850 nm. For the spot diagram 42, the value of b was taken to be zero, to represent a conventional aspheric lens. One can see by comparing the spot diagrams 42 and 43 that including the helical sag component of Eq. (2) with b of only 3 microns results in dramatic reduction of backreflection into the VCSEL aperture 22, due to most of the light reflected from the fiber 24 encircling the light source aperture 22 in a donut-like pattern 45. The donut-like pattern 45 is formed without having the cone component 35 in the sag of the lens 23. Surprisingly and advantageously, when no cone sag component 35 is present in the sag of the lens 23, the donut-shaped light spot 45 is formed almost without increasing the spot size at the tip of the fiber 24.

A skilled artisan will realize that other rotationally symmetrical sag components may be utilized in place of the component $S_A$ of Eq. (1) to achieve light focusing at the tip of the fiber 24. For example, an even aspheric sag component having even power of r terms, such as $r^2$, $r^4$, $r^6$ and so on, can be used. The skilled artisan will also realize that the helical sag component defined by Eqs. (2) or (3) can be substituted for another rotationally asymmetrical sag component to achieve donut-shaped light spot 45 encircling the aperture 22 of the light source.

Figure 5A:
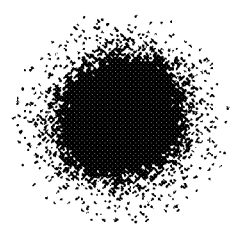
FIGS. 5A and 5B are spot diagrams of light focused onto a fiber tip, and of light reflected back onto a light source, respectively, at a first focusing distance, in accordance with the present invention.
Figure 5B:
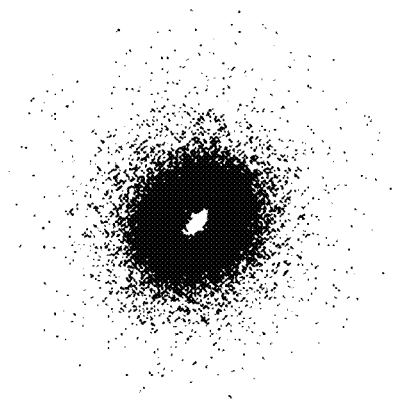
Figure 5C:
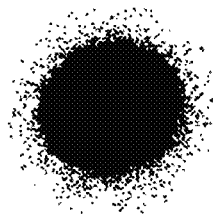
FIGS. 5C and 5D are spot diagrams of light focused onto the fiber tip and light reflected back onto the light source, respectively, at a second focusing distance, in accordance with the present invention.
Figure 5D:
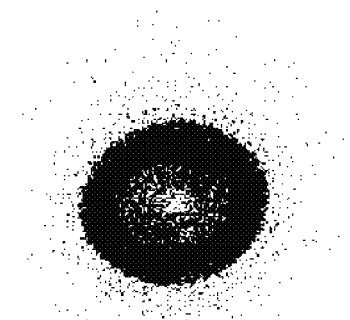

Referring now to FIGS. 5A to 5D, spot diagrams of light focused onto the fiber tip (FIGS. 5A, 5C) and of light reflected back onto the light source (FIGS. 5B, 5D) are shown. The spot diagrams of FIGS. 5A to 5D are obtained using a ZEMAX simulation of light focusing by a lens having the surface sag S defined by Eq. (4). The spot diagrams of FIGS. 5A to 5D are at the same scale. The spot diagrams of FIGS. 5C and 5D are obtained at a focusing distance offset by 30 microns from the focusing distance of FIGS. 5A and 5B, to illustrate depth-of-focus. On can observe that the focal spots of FIGS. 5A and 5C are continuous spots, while focal spots of FIGS. 5B and 5D are donut-shaped spots. In operation, the continuous spots of FIGS. 5A and 5C are disposed within the aperture 25 of the receiving optical fiber 24, and the donut-shaped spots of FIGS. 5B and 5D encircle the aperture 22 of the light source 21.

It has been found, surprisingly, that avoiding the cone component 35 in the sag component S defined by Eq. (4) allows the spot size at the optical fiber side to remain compact, simplifying the task of coupling light into the optical fiber 24, while reducing optical feedback as explained above. A compact, continuous spot having a non-zero optical power present at a center of the fiber aperture 25 can be obtained, while at the same time having a donut-shaped reflection spot surrounding the VCSEL aperture 25. The smaller spot size, as compared to a case of having a cone sag component in the lens surface sag, allows one to relax the manufacturing tolerances, while having the benefit of reduced backreflection and optical feedback into the VCSEL aperture 22. Relaxing manufacturing tolerances results in considerable cost savings.

Figure 6:
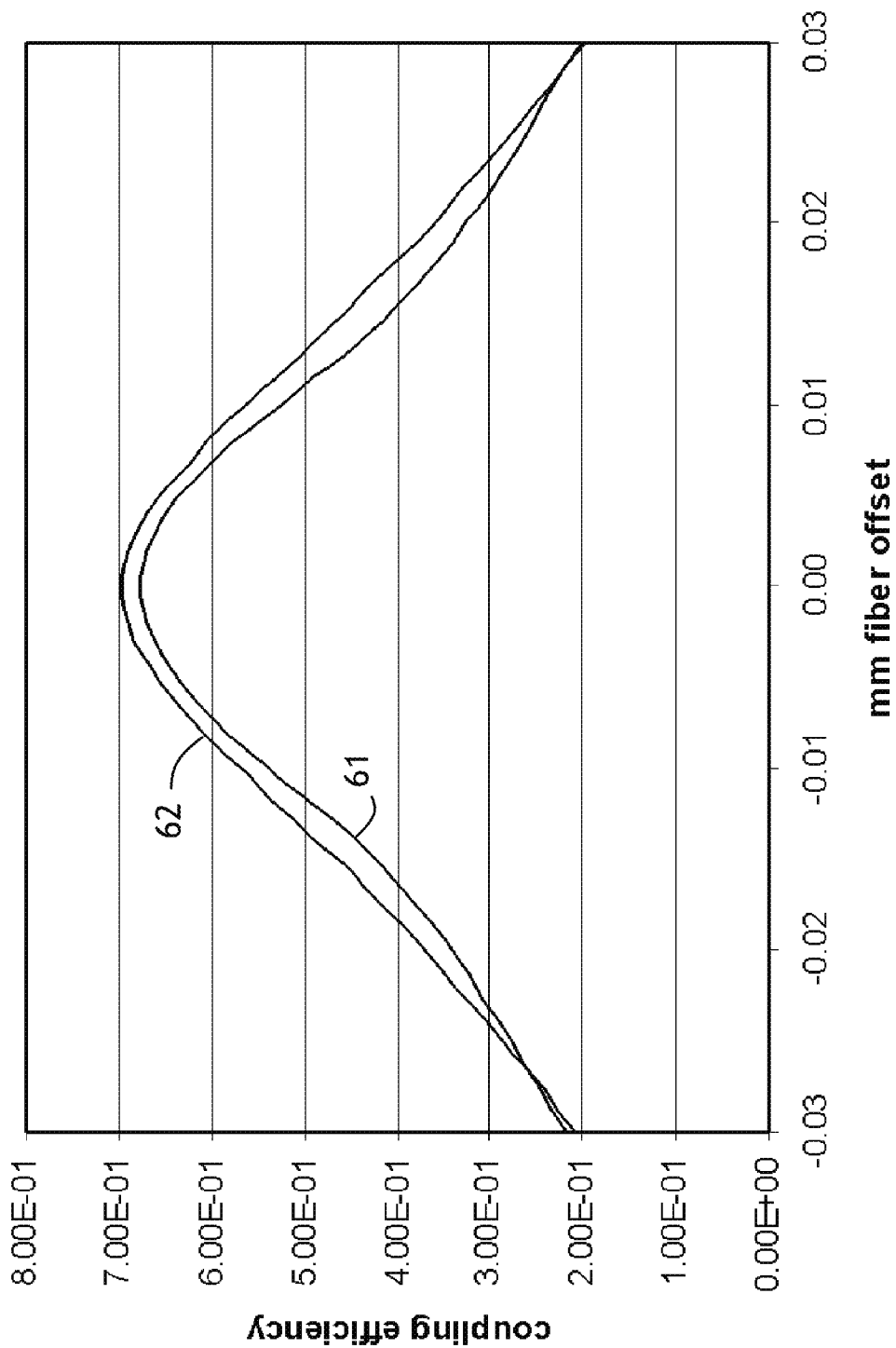
FIG. 6 is a plot of fiber coupling efficiency as a function of lateral displacement of the optical fiber the optical subassembly of FIG. 2.

Referring now to FIG. 6, a plot of fiber coupling efficiency as a function of lateral displacement of the optical fiber 24 is shown. A curve 61 corresponds to the fiber coupling efficiency obtained with the lens 23 having the surface 26A having the sag S defined by Eq. (4), where 1/c=0.567 mm; k=−1.42; and b=3 microns. The same parameters were used to produce the spot diagrams 41 and 43 of FIG. 4. A curve 62 is obtained at b=0 microns, that is, the curve 62 corresponds to a conventional aspherical lens. Light source numerical aperture of 0.2 was used in both cases. Compared to the case of a conventional lens, using the asphere-vortex lens 23 results in a reduction of coupling efficiency by approximately 3%, but shows no noticeable reduction of lateral fiber position tolerance.

Figure 7:
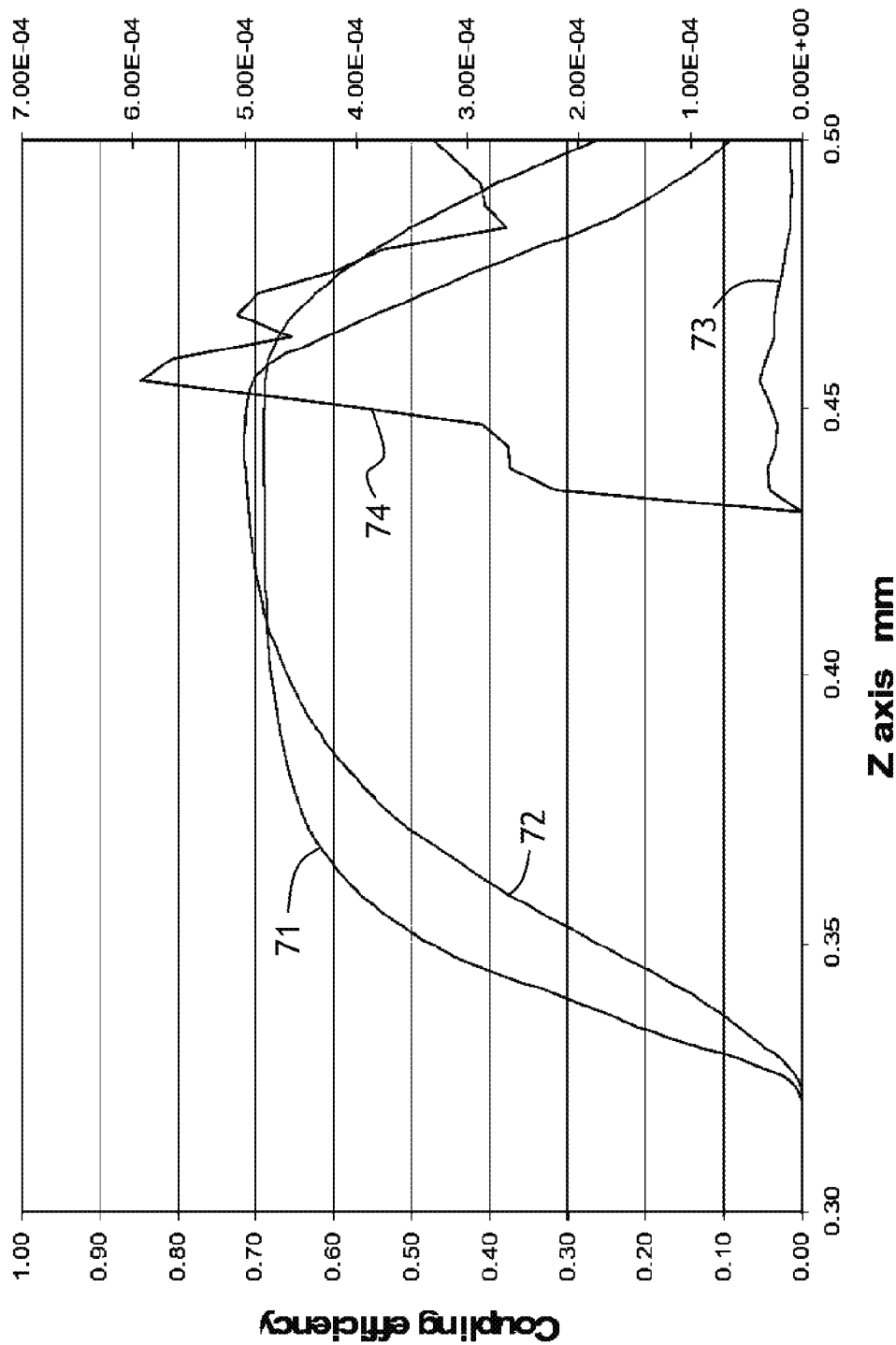
FIG. 7 is a plot of fiber coupling efficiency and backreflection as a function of fiber displacement along the optical axis (defocusing) the optical subassembly of FIG. 2.

Turning to FIG. 7, a plot of calculated fiber coupling efficiency and backreflection as a function of fiber displacement along the optical axis is shown. The calculation has been performed for a case of the lens having a helical step b in Eq. (2) of 10 microns. Two values of the light source NA were used, 24 and 30 degrees. Curves 71 and 72 correspond to fiber coupling efficiency at the NA of 24 and 30 degrees, respectively. Curves 73 and 74 correspond to the backreflection at the same respective NA values. The left- and right-hand scales are fiber coupling efficiency and backreflection, respectively. One can see that a fiber coupling efficiency of over 65% is achievable at negligible backreflection for both values of NA at Z-axis positions of the optical fiber between 0.4 and 0.43 mm.

The aforementioned calculations were performed for lens material Ultem™ 1010, which has an index of refraction of 1.632 at a pre-determined wavelength of 850 nm. Once the material and the wavelength are determined, the helical lens step height b remains the only variable for optimizing the optical phase difference between the top and bottom of the helix. The step height values of less than 8 microns, and preferably less than 6 microns, and most preferably less than 4 microns can be used for a VCSEL application. The value of b is selected by taking into account a tradeoff between reduction of optical feedback on one hand, and coupling efficiency and fiber position tolerance on the other. Calculations show that b=7 microns vortex step should result in a focal spot at the fiber side having between 10% and 19% of encircled optical energy within a 4.5 microns radius, with some energy present in the center mode. For comparison, a standard non-vortex aspheric lens couples about 55% of encircled optical energy within the 4.5 microns radius. IEEE communications standards require <30% of the encircled optical energy within 4.5 microns radius and >86% of the encircled optical energy within 19 microns radius. One can shift a fiber slightly out of focal spot of a standard lens, so that the IEEE requirement is not violated, with about 30% inside a radius ranging from 4.5 to 6.5 um. This out-of-focus shift increases the spot size at the fiber slightly, by approximately the same amount as a vortex lens of the present invention; however, in the case of the vortex lens of the invention, the backreflection into the laser is significantly reduced.

In general, the optical phase difference $\Phi$ across a rotationally asymmetrical vortex lens having a step b is calculated using the following equation:

$$\Phi = 2\pi b(n_L - 1)\lambda_V \quad (5)$$

wherein $n_L$, is the refractive index of the lens material, $\lambda_V$ is the laser wavelength.

For example, an Ultem™ 1010 lens in an application at 850 nm having a step b of 7 microns will generate the maximum optical phase variation $\Phi$ at the aperture 25 of the optical fiber 24 of $10\pi$. Preferably, the same maximum phase difference of $10\pi$ can be used in a variety of optical subassemblies for coupling light, for example in a parallel transceiver or in a fiber to laser coupler. Further, preferably, the step b, which is a magnitude of the rotationally asymmetrical component 34, is such that over 90% of the optical power of light impinging onto the optical fiber are coupled into the optical fiber, while less than 10% of the optical power of light reflected from the optical fiber onto the light source are coupled back into the aperture of the light source. These values of >90% and <10% can be achieved, for example, for the aperture 22 of the light source 21 and for the aperture 25 of the fiber 24 having radiae of 4+/−1 microns and 25+/−1 microns, respectively.

Presence of the helical component in the sag function of a focusing lens as described by Eqs. (2) and (3) results in a considerable reduction of the optical feedback. It has been discovered that, in view of recent improvement of multimode optical fibers, it is not necessary to form a ring within the fiber aperture 25 by including a cone component in the sag function of the focusing lens because forming of such a ring will not improve modal dispersion of the newer fibers while increasing spot size at the fiber tip. The modal dispersion of these newer multimode optical fibers will not be improved because their modal performance is already improved, regardless of the light launching conditions.

In fact, including the cone (sometimes called "negative axicon") component in overall sag function of a focusing lens has been found to be detrimental. It has been discovered that including a cone component results in increase of an overall spot size at the fiber, increasing sensitivity to misalignment, while including a helical component defined by Eqs. (2) or (3) does not increase, or increases negligibly, the spot size at the fiber, allowing for more room for mechanical and optical tolerances. Thus, it is not necessary to focus light onto to the end of the fiber in a ring intensity profile in order to obtain reduced modal dispersion because of availability of multi-mode fibers with reduced modal dispersion. The advantage obtained is the increased alignment tolerance, which is important in the fabrication of a low cost vortex lens coupling element using injection molding techniques for coupling light from a VCSEL array into a fiber array.

Figure 8:
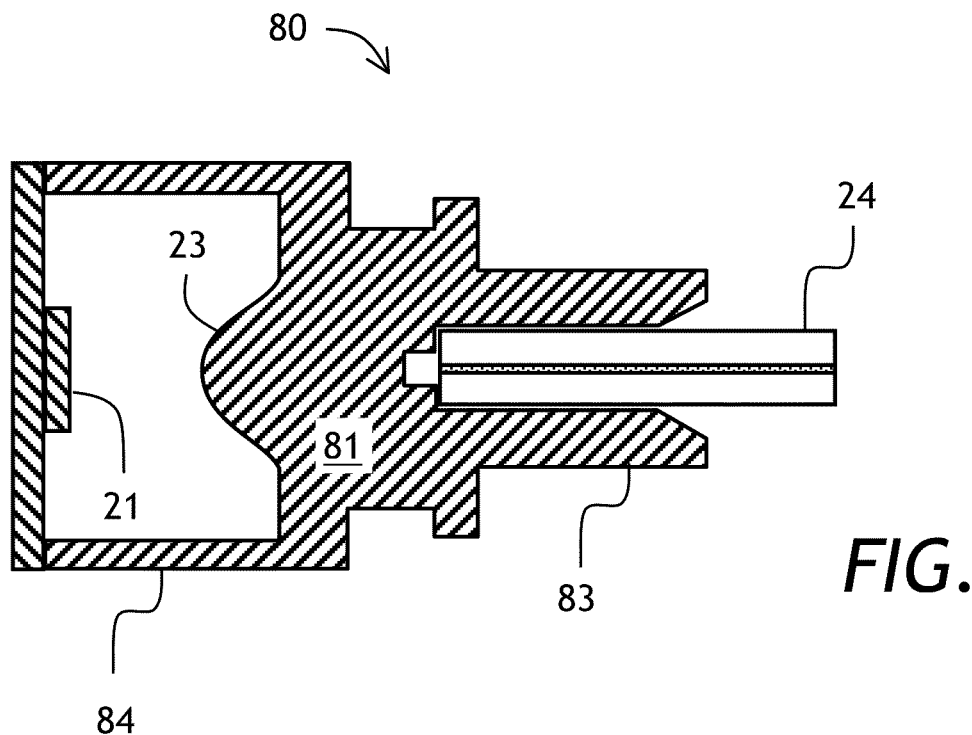
FIG. 8 is a cross-sectional view of an optical subassembly of the present invention including a monolithically integrated housing.

Referring now to FIG. 8, a cross-sectional view of an optical subassembly 80 of the present invention is shown. It corresponds to the assembly 20 of FIG. 2. In the subassembly 80, a housing 81 having a fiber connector sleeve 83 for holding the optical fiber 24 and a cylindrical enclosure 84 for holding and enclosing the VCSEL 21 and other components, not shown, is monolithically integrated with the lens 23. The housing 81 is preferably manufactured by injection molding from thermoplastic resins, such as Ultem™ 1010 (polyetherimide). The improved mechanical tolerances of injection molding process, as compared to a traditional machining process, are beneficially used for active alignment of the optical subassembly 80. Furthermore, the injection molding is a rather inexpensive manufacturing process for manufacturing large quantities of housings 81.

Figure 9A:
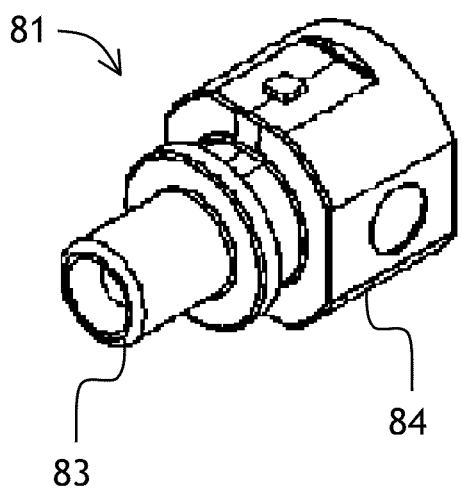
FIGS. 9A and 9B are isometric views of the housing of the optical subassembly of FIG. 8.
Figure 9B:
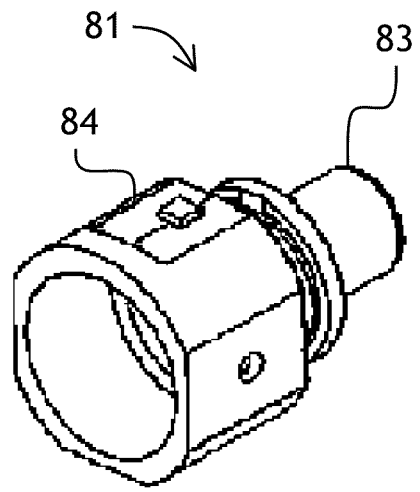

Turning now to FIGS. 9A and 9B, isometric views of the monolithic housing 81 of FIG. 8 are shown. The optical subassembly 80 is manufactured by inserting the optical fiber 24 into the fiber connector sleeve 83 and attaching the VCSEL 21 to the cylindrical enclosure 84.

What is claimed is:

1. An optical subassembly comprising a light source having an aperture for emitting light, an optical waveguide having an aperture for receiving light, and a lens for coupling light emitted from the light source aperture into the optical waveguide aperture,
    wherein the lens has a surface having a sag consisting of a superposition of a rotationally symmetrical sag component and a rotationally asymmetrical sag component,
    wherein in operation, the rotationally asymmetrical sag component results in lessening of coupling of light reflected from the optical waveguide back into the light source aperture, due the light reflected from the optical waveguide forming a donut-shaped spot at the light source, whereby at least a fraction of the reflected light encircles the light source aperture, and
    wherein the rotationally symmetrical sag component is one of spherical sag component or aspherical sag component not having a cone sag component.

2. The optical subassembly of claim 1, wherein light emitted by the light source is focused into a spot disposed substantially within the aperture of the optical waveguide.

3. The optical subassembly of claim 2, wherein the optical waveguide is disposed relative to the lens such that in operation, a non-zero optical power of light emitted by the light source is present at a center of the optical waveguide aperture.

4. The optical subassembly of claim 2, wherein in the rotationally asymmetrical sag component has such a magnitude that in operation, over 90% of the optical power of light impinging onto the optical waveguide is coupled into the optical waveguide, while less than 10% of the optical power of light reflected from the optical waveguide onto the light source is coupled back into the aperture of the light source.

5. The optical subassembly of claim 4, wherein the apertures of the light source and the optical waveguide are circles having radiae of 4+/−1 microns and 25+/−1 microns, respectively.

6. The optical subassembly of claim 1, wherein the rotationally asymmetrical sag component is a helical component $S_B$ represented by the equation $$S_B = \frac{b}{2\pi}\phi,$$

wherein $\phi$ is the azimuthal angle of a polar coordinate system, and b is a helical step size.

7. The optical subassembly of claim 1, wherein the rotationally asymmetrical sag component is a segmented helical component $S_{B2}$ represented by equation $$S_{B2} = b \cdot F\left(M\frac{\phi}{2\pi}\right),$$

wherein $\phi$ is the azimuthal angle of a polar coordinate system, b is a helical step size, M is the number of segments, and F is a fraction function returning the value to the right from the decimal point.

8. The optical subassembly of claim 1, wherein the rotationally symmetrical sag component is an even aspherical sag component.

9. The optical subassembly of claim 1, wherein the asymmetrical sag component in the sag of the lens surface results in an optical phase variation at the aperture of the optical waveguide of no more than $10\pi$.

10. The optical subassembly of claim 1, wherein the light source is a VCSEL.

11. The optical subassembly of claim 10, wherein the optical waveguide is an optical fiber.

12. The optical subassembly of claim 11, wherein the optical waveguide is a multimode optical fiber.

13. The optical subassembly of claim 12, further comprising a housing for supporting the optical fiber and the VCSEL.

14. The optical subassembly of claim 13, wherein the housing is monolithically integrated with the lens.

15. A method for coupling light from a light source into an optical waveguide, comprising:
    (a) providing a lens for coupling light emitted from an aperture of the light source into an aperture of the optical waveguide,
        wherein the lens has a surface having a sag consisting of a superposition of a rotationally symmetrical sag component and a rotationally asymmetrical sag component,
        wherein the rotationally asymmetrical sag component is selected to lessen coupling of light reflected from the optical waveguide back into the light source aperture, and
        wherein the rotationally symmetrical sag component is one of spherical sag component or aspherical sag component not having a cone sag component; and
    (b) launching light from the light source aperture through the lens towards the optical waveguide aperture.

16. The method of claim 15, wherein the rotationally asymmetrical sag component is a helical sag component.

17. The method of claim 15, wherein the rotationally symmetrical sag component is an even aspherical sag component.

18. The method of claim 15, wherein the light source is a VCSEL.

19. The method of claim 15, wherein in step (b), a non-zero optical power of light emitted by the light source is present at a center of the optical waveguide aperture.

20. The method of claim 15, wherein in step (b), over 90% of the optical power of light impinging onto the optical waveguide are coupled into the optical waveguide, while less than 10% of the optical power of light reflected from the optical waveguide onto the light source are coupled back into the aperture of the light source.

* * * * *